Oct. 28, 1969     L. J. JENN     3,474,724

CAPSULE FOR USE IN A STOVE

Filed April 26, 1968     2 Sheets-Sheet 1

INVENTOR
LOUIS J. JENN

BY

ATTORNEY

Oct. 28, 1969 L. J. JENN 3,474,724
CAPSULE FOR USE IN A STOVE
Filed April 26, 1968 2 Sheets-Sheet 2

INVENTOR
LOUIS J. JENN
BY
ATTORNEY 3,474,724
CAPSULE FOR USE IN A STOVE

Louis J. Jenn, Indianapolis, Ind., assignor to Jenn-Air Corporation, Indianapolis, Ind., a corporation of Indiana
Filed Apr. 26, 1968, Ser. No. 724,417
Int. Cl. A47j 37/06; F24c 7/04, 15/20
U.S. Cl. 99—259         3 Claims

ABSTRACT OF THE DISCLOSURE

An improved element for a broiler consisting of a flat bed of crushed basalt rock capsulated in a pervious basket. Its purpose is to be inserted in a stove in proximity to a source of heat to receive heat therefrom and be positioned beneath broiling meat or the like to intercept grease falling therefrom and at least partially ignite it to dispense smoke onto the meat so that the advantages of charcoal broiling may be realized without the disadvantage of having sustained grease flame rising to the level of the grill in contact with the edibles. A used and dirty capsule can be removed from the stove and easily washed in an ordinary dishwasher and replaced in position in the stove for reuse.

CROSS-REFERENCE TO ANOTHER APPLICATION

This invention relates to an improved basket for use with the type of cooking apparatus disclosed in U.S. Patent application Ser. No. 628,499 filed Apr. 4, 1967.

BACKGROUND OF THE INVENTION

In open broiling of food on a charcoal fire or above an electric heating element, fat and grease drippings fall on the heating surface or other adjacent surfaces and cause flash fires. Often these fires become uncontrolled and render heat far in excess of the proper broiling temperature thus causing damage to the meat. While it is advantageous to have a charred flavor to broiled meat caused by smoke from flash fire, it is necessary to avoid uncontrolled burning. It is to this end that the present invention is directed.

In the past it has been common practice to control flame up by using low wattage or to provide an underlying drip pan partially filled with water so that grease drippings falling therein will be cooled. While units of this type are splatter free and smoke free, they are not successful in cooking because of the long time required or because the presence of water and steam prevents a searing of the meat essential to retention of natural juices.

DESCRIPTION OF PREFERRED FORM

Figure 1:
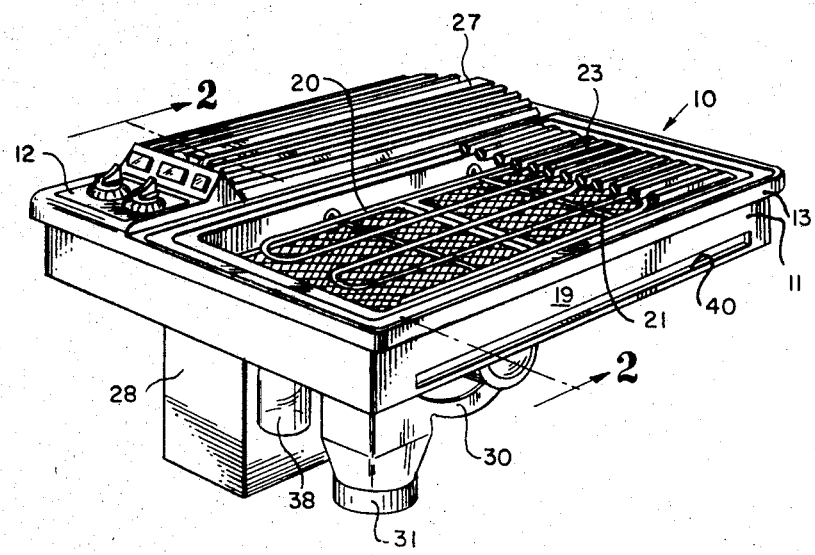
FIGURE 1 is a perspective view of a broiler unit embodying features with which the present invention may be advantageously used.
Figure 2:
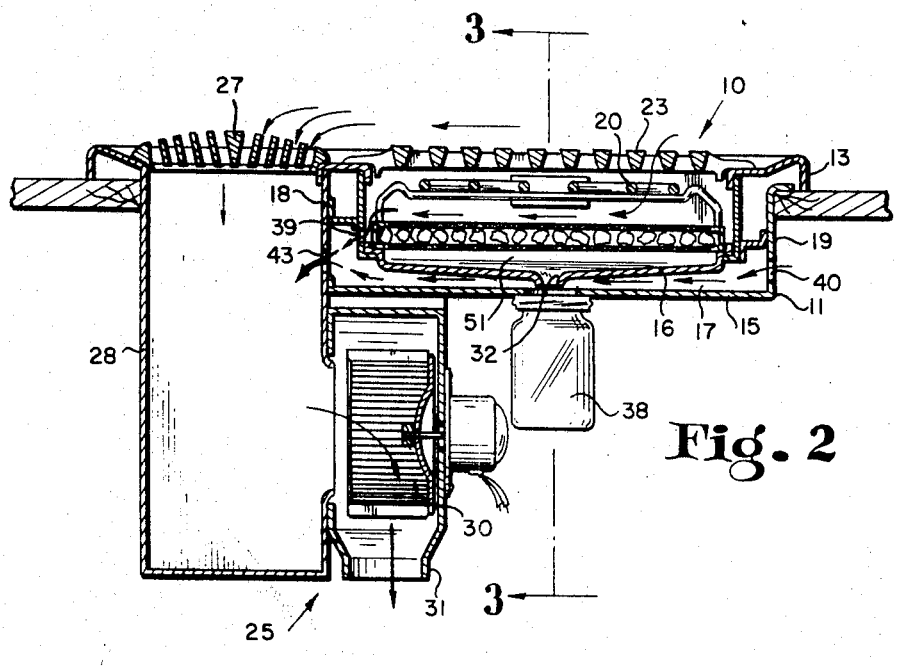
FIGURE 2 is a cross-sectional view taken substantially along line 2—2 of FIGURE 1.
Figure 3:
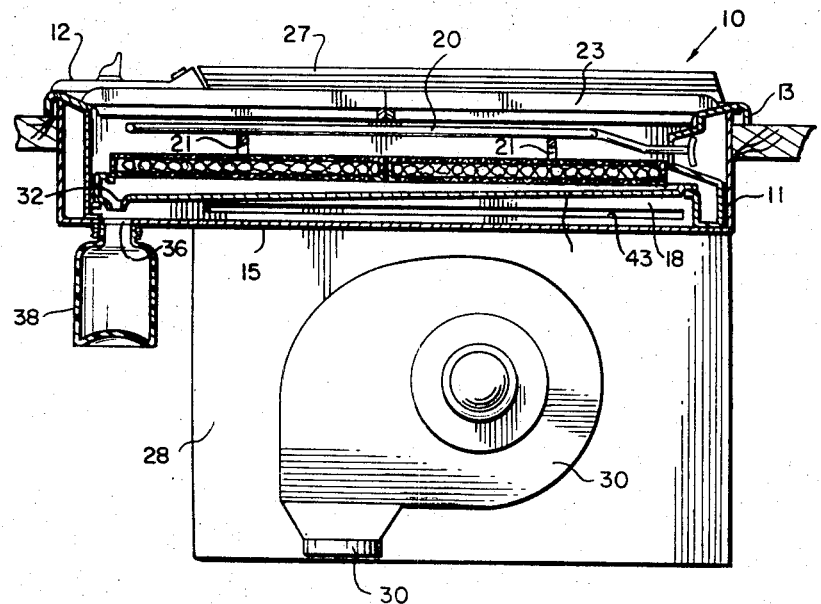
FIGURE 3 is a cross-sectional view taken substantially along line 3—3 of FIGURE 2.

Referring now to FIGURES 1 through 3, an exemplary broiler unit, generally indicated at 10, is illustrated, the broiler including a rough-in box 11, a control panel 12, and a cover plate 13 sized to overlie the rough-in box 11. In a typical built-in installation, the rough-in box 11 is set down into a counter and the cover plate 13 lies flush with the counter-top. As best seen in FIGURE 2, a burner box 14 is mounted in the rough-in box 11 and disposed in a manner whereby its bottom 16 is spaced above the bottom 15 of the rough-in box 11 creating an air space 17, the purpose of which will soon become readily apparent to the reader. To provide a source of heat for cooking, an electrical resistance heating element 20 preferably of the shielded type, is horizontally disposed across the upper portion of the burner box 14 and below the surface of cover plate 13 by support rods 21. In order to support food while being cooked, a grill 23 is horizontally disposed above and in relatively close relationship to, the heating element 20 to insure that a maximum amount of heat emitted by the element 20 reaches food supported on the grill 23.

In order to eliminate the smoke, and grease laden vapors that are given off by food during cooking from permeating the interior of the house, the broiler unit 10 is mounted adjacent to a fume exhaust system generally indicated at 25. As best seen in FIGURE 2, this system includes an intake opening 27, a plenum housing 28 and a power driven exhaust fan 30. In operation, the actuation of the exhaust fan 30, continuously draws the air overlying the cooking grill 23 through the intake opening 27 and into the plenum housing 28 where it is then exhausted to the outdoors or back into the kitchen by means of ducting (not shown) extending from the discharge side 31 of the fan 30. Thus, it will be appreciated that the air borne smoke and grease laden vapors given off by food cooking on the grill 23 will likewise be drawn through the intake opening 27 and exhausted to the outdoors or filtered and returned to the kitchen before they can escape into the air surrounding the broiler unit 10.

In accordance with one of the important aspects of the present invention, provision is made for cooking on the broiler unit 10 at a temperature high enough to sear meat so that it will retain its natural juices during cooking, while maintaining the temperature of the rough-in box 11 and burner box 14 at a range which will enable the broiler unit 10 to be installed in a counter-top without creating a fire hazard and which furthermore will appreciably reduce the possibility of a flash fire occurring from the ignition of fat and grease that have dripped into the burner box 14. To accomplish this, an elongated slot 40 (FIGURES 1 and 2) opening into the air space 17, is provided in the outer side wall 19 of the rough-in box 11, and a second slot 43 extends into plenum housing 28 to provide air communication between the air space 17 and the inside of the plenum housing 28. Thus as figuratively depicted in FIGURE 2, upon the activation of the exhaust fan 30, a continuous supply of fresh air will be drawn into the slot 40, across the air space 17, and through slot 43 into the plenum chamber 28 where it is exhausted to the outdoors in a manner hereintofore described in conjunction with the exhaust system 25. As will be readily apparent to those versed in heat transfer, the continuous flow of fresh air across the air space 17 will, by means of convection, offset the heat transferred to the burner box 14, cover plate 13 and rough-in box 11 by the heating element 20, and therefore maintain the steady state operating temperature of these parts at a reduced level permitting in turn, the use of a heating element 20 having a substantially higher heat output. Additionally, if the broiler unit 10 is installed in a cabinet which does permit fresh air from the kitchen to be drawn into slot 40, it is contemplated that the cabinet would be provided with an air hole, louver, or the like.

In order to impart additional cooling to the broiler unit 10, an additional flow of fresh air is provided across the upper surface of the bottom 16 of the burner box 14. To accomplish this, a slot 39 (FIGURE 2) is provided in the sidewall of the burner box 14 which establishes air communication between the burner box 14 and the interior of the plenum housing 28. Accordingly, when the fan 30 is activated, in addition to the air flow just described, air will also be drawn into and through the burner box 14 and then removed through the slot 39 into the plenum housing 28.

In accordance with another aspect of the present invention, provision is made for reducing the possibility of the occurrence of a flash fire resulting from the ignition of grease and fat drippings that have fallen into the burner box 14. This is accomplished in two distinct ways. The first is by reducing the operating temperatures of the parts of the broiler unit 10 which are exposed to these drippings as heretofore discussed, and the second is by preventing these drippings from accumulating at areas within the broiler unit 10 where they would be exposed to heat high enough to raise them to their flash point. In furtherance of this second aim, and with reference to FIGURES 2 and 3, the bottom 16 of the burner box 14 is formed to define an angularly disposed drip pan 22 for draining grease toward an opening 32. As best seen in FIGURE 3, opening 32 overlies a second opening 36 in bottom 15 of rough-in box 11 and a jar lid 37 which is permanently secured thereto in order to receive a removable grease collecting jar 38.

Accordingly, when cooking is taking place on the broiler unit 10, the grease and fat released from the food will drip down through the food supporting grill 23, on to the drip pan 22 and flow downwardly thereon into opening 32 wherefrom it will drain through the aperture 36 and be directed into the grease collecting jar 38. It will also be appreciated that by providing a standard size jar lid 37, the jar 38 can be disposed of when filled and easily and inexpensively replaced, thus eliminating any necessity for its emptying or cleaning or if desired they could be used for cooking purposes such as for example, basting or making gravy.

It is additionally pointed out that if the heating element 20 and the fan 30 are continued to be operated for several minutes after cooking is completed, the drippings and grease remaining in the burner box 14, will be vaporized by the heating element 20 and exhausted through the slot 39, thus providing the broiler unit with a self-cleaning operation.

In order to impart an appearance more closely resembling a charcoal barcecue unit, the broiler is provided with a horizontal bed of simulated charcoal briquettes 45 which underlie the heating element 20. The briquettes 45 are preferably pieces of rock which prior to and during cooking absorb heat from the heat source to cause drippings falling thereon to smoke thus imparting added flavor to cooking meat.

It has been found from experience that intense heat coming in contact with the rocks causes them to chip, crack and otherwise deteriorate with use. Applicant has found that basalt rock which is a dark, dense igneous rock of lava flow performs very well under these conditions of heat and does not decompose by chipping or breaking.

Figure 4:
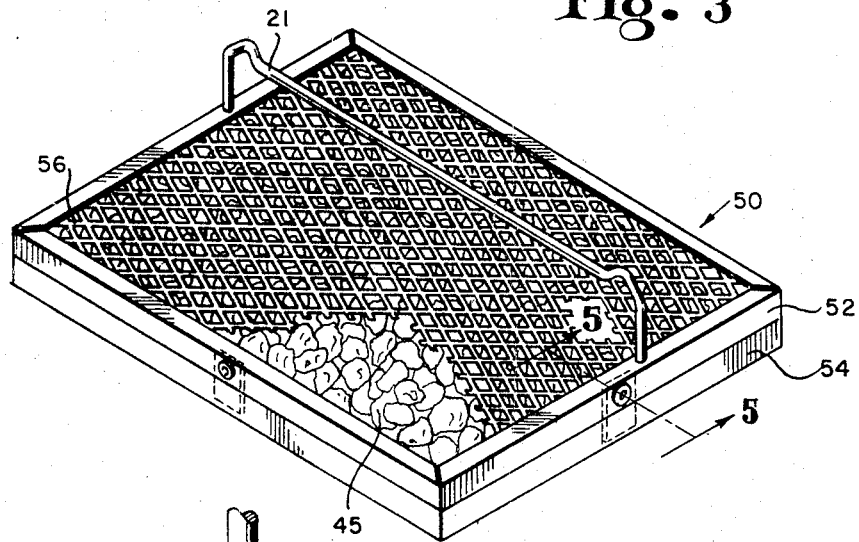
FIGURE 4 is a perspective view of the basket or cartridge to which this invention is directed.
Figure 5:
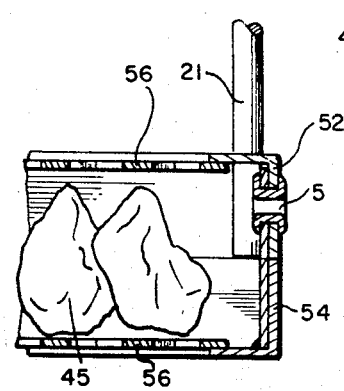
FIGURE 5 is a cross-sectional view taken substantially long line 5—5 of FIGURE 4.

This bed of briquettes is preferably contained in an enclosed basket 50 as shown in FIGURE 4. The basket is comprised of two substantially similar and mating halves 52, 54 each of which includes a generally rectangular frame covered with expanded metal 56 to form a basket which when riveted together as shown in FIGURE 4 and 5 define a basket or cartridge like arrangement for the basalt rock. These baskets are adapted to be used in pairs in broiler unit 10 to underlie the heating elements as shown in perspective view 1. A basket is shown in cross-sectional views 2 and 3.

In operation the trays or capsules containing basalt rock are placed underneath the heating element above bottom wall 16 of drip pan 22. Thus when drippings fall into toward burner box 14, they must pass through the basket and come into contact with the hot basalt rock and pass therethrough before reaching the drip pan. Whenever the grease drippings strike the hot rock, smoke is emitted which rises and comes in contact with the meat. The rocks are maintained at a temperature below the temperature which would cause the grease to burn.

The grease passes relatively freely through the pervious basket and rock.

As clearly shown in FIGURE 2, the baskets rest on a ridge formed above bottom 17 so as to establish space 51 between the bottom of the basket and bottom 16. Supporting rods 21 of baskets 50 extends upwardly and across for the purpose of supporting electrical heating elements 20.

During use of the broiler the basket of basalt rock will become dirt and it will be necessary to clean. By reason of the removable self contained compact baskets or cartridge disclosed herein, cleaning becomes rather simple. The cartridges are merely removed after use and placed in an ordinary dishwasher where detergent and water remove the colletced grease and ash. The cartridge are then ready for re-use in the broiler.

I claim:
1. In a stove having a grill for supporting meat or the like to be cooked by an underlying heat source, a capsule disposed beneath the heat source and above grease collection means, air exhaust means for moving air across the surface of the grill to remove smoke and fumes and for moving air through the stove adjacent said capsule and grease collection means for regulating their temperature, the improvement residing in said capsule comprising:
  frame structure including a pair of spaced apart generally parallel pervious wall portions receiving a layer of crushed basalt rock therebetween,
  said capsule adapted to be removably positioned beneath the heat source in proximity thereto in generally horizontal position so as to receive heat therefrom,
  said heated capsule adapted to intercept grease drippings falling toward the pan and by reason of heat therein causing at least partial combustion to generate smoke for rising into contact with the meat and further allowing the drippings to pass on through the pervious walls and space between adjacent rocks into the grease collection means,
  the capsule being removable from said stove and adapted for submersion in a dishwasher for cleaning.
2. The claimed subject matter of claim 1 wherein said pervious walls are formed of expanded metal.
3. The claimed subject matter of claim 1 wherein said capsule includes a bracket for supporting said heating element spaced therefrom.

References Cited

UNITED STATES PATENTS

| | | | |
|---|---|---|---|
| 2,790,434 | 4/1957 | Del Francia | 126—41 |
| 2,848,990 | 8/1958 | Haedike et al. | |
| 2,967,023 | 1/1961 | Huckabee | 99—259 XR |
| 3,075,334 | 1/1963 | Nutting | 55—519 XR |
| 3,086,449 | 4/1963 | Cahill | 99—446 |
| 3,098,427 | 7/1963 | Del Francia | 99—446 |
| 3,186,149 | 6/1965 | Ayers. | |
| 3,407,803 | 10/1968 | Cervenak | 126—25 |

WALTER A. SCHEEL, Primary Examiner

A. O. HENDERSON, Assistant Examiner

U.S. Cl. X.R.

99—340; 126—41